US008087926B2

(12) United States Patent
Patrick et al.

(10) Patent No.: US 8,087,926 B2
(45) Date of Patent: Jan. 3, 2012

(54) OXY-FUEL COMBUSTION WITH INTEGRATED POLLUTION CONTROL

(75) Inventors: Brian R. Patrick, Chicago, IL (US); Thomas Lilburn Ochs, Albany, OR (US); Cathy Ann Summers, Albany, OR (US); Danylo B. Oryshchyn, Philomath, OR (US); Paul Chandler Turner, Independence, OR (US)

(73) Assignee: Jupiter Oxygen Corporation, Schiller Park, IL (US)

( * ) Notice: Subject to any disclaimer, the term of this patent is extended or adjusted under 35 U.S.C. 154(b) by 1022 days.

(21) Appl. No.: 11/306,437

(22) Filed: Dec. 28, 2005

(65) Prior Publication Data

US 2007/0207419 A1  Sep. 6, 2007

(51) Int. Cl.
*F23C 5/00* (2006.01)

(52) U.S. Cl. .............. 431/8; 431/5; 431/202; 110/233; 110/344; 110/345; 60/646; 60/649; 60/657; 60/673

(58) Field of Classification Search .............. 431/5, 8, 431/202; 266/221; 60/649, 646, 657, 673; 110/233, 344, 345; 502/39
See application file for complete search history.

(56) References Cited

U.S. PATENT DOCUMENTS

| 3,630,887 | A | | 12/1971 | Mounce |
| 4,041,708 | A | * | 8/1977 | Wolff ............................ 60/649 |
| 4,411,136 | A | * | 10/1983 | Funk ............................ 60/648 |
| 4,513,573 | A | * | 4/1985 | Funk ............................ 60/648 |
| 4,542,114 | A | | 9/1985 | Hegarty |
| 5,122,352 | A | * | 6/1992 | Johnson .................. 423/243.12 |
| 5,783,082 | A | | 7/1998 | DeSimone et al. |
| 5,787,821 | A | * | 8/1998 | Bhat et al. .................. 110/216 |
| 5,826,518 | A | * | 10/1998 | Bhat et al. .................. 110/216 |
| 6,119,606 | A | | 9/2000 | Clark |
| 6,196,000 | B1 | * | 3/2001 | Fassbender .................. 60/649 |
| 6,202,574 | B1 | | 3/2001 | Liljedahl et al. |

(Continued)

FOREIGN PATENT DOCUMENTS

JP  05-168853  7/1993

OTHER PUBLICATIONS

U.S. Appl. No. 11/753,393, filed May 24, 2007, Ochs.

(Continued)

*Primary Examiner* — Steven B McAllister
*Assistant Examiner* — Avinash Savani
(74) *Attorney, Agent, or Firm* — John S. Paniaguas; Katten Muchin Rosenman LLP

(57) ABSTRACT

An oxygen fueled integrated pollutant removal and combustion system includes a combustion system and an integrated pollutant removal system. The combustion system includes a furnace having at least one burner that is configured to substantially prevent the introduction of air. An oxygen supply supplies oxygen at a predetermine purity greater than 21 percent and a carbon based fuel supply supplies a carbon based fuel. Oxygen and fuel are fed into the furnace in controlled proportion to each other and combustion is controlled to produce a flame temperature in excess of 3000 degrees F. and a flue gas stream containing CO2 and other gases. The flue gas stream is substantially void of non-fuel borne nitrogen containing combustion produced gaseous compounds. The integrated pollutant removal system includes at least one direct contact heat exchanger for bringing the flue gas into intimated contact with a cooling liquid to produce a pollutant-laden liquid stream and a stripped flue gas stream and at least one compressor for receiving and compressing the stripped flue gas stream.

21 Claims, 1 Drawing Sheet

U.S. PATENT DOCUMENTS

| | | |
|---|---|---|
| 6,436,337 B1 | 8/2002 | Gross |
| 6,596,220 B2 | 7/2003 | Gross |
| 6,598,398 B2 | 7/2003 | Viteri et al. |
| 6,797,228 B2 | 9/2004 | Gross |
| 6,818,176 B2 | 11/2004 | Gross |
| 6,898,936 B1 * | 5/2005 | Ochs et al. .................. 60/649 |
| 6,918,253 B2 | 7/2005 | Fassbender |
| 7,007,474 B1 | 3/2006 | Ochs et al. |
| 2003/0097840 A1 | 5/2003 | Hsu |
| 2004/0046293 A1 * | 3/2004 | Gross .................. 266/221 |
| 2004/0237909 A1 | 12/2004 | Krebs |

OTHER PUBLICATIONS

Int'l Search Report, Jan. 14, 2010.

* cited by examiner

OXY-FUEL COMBUSTION WITH INTEGRATED POLLUTION CONTROL

CONTRACTUAL ORIGIN OF THE INVENTION

The United States Government has rights in this invention pursuant to employer/employee agreement between the U.S. Department of Energy (DOE) and some of the inventors and through license agreements with the assignee of the invention.

BACKGROUND OF THE INVENTION

The present invention pertains to an integrated oxygen fueled combustion and pollution control system. More particularly, the present invention pertains to an oxy-fueled combustion system having integrated pollution control to effectively reduce, to near zero, emissions from combustion sources.

Oxy-fueled combustion systems are known in the art. Such systems use essentially pure oxygen for combustion with fuel in near stoichiometric proportions and at high flame temperatures for high efficiency energy production. Oxy-fuel systems are used in boilers to produce steam for electrical generation and in industrial settings, such as in aluminum recycling to melt aluminum for recasting. It is also contemplated that oxy-fueled combustion can be used for waste incineration as well as other industrial and environmental applications. Oxy-fuel technology and uses for this technology are disclosed in Gross, U.S. Pat. Nos. 6,436,337, 6,596,220, 6,797,228 and 6,818,176, all of which are commonly owned with the present application and are incorporated herein by reference.

Advantageously, because oxy-fuel combustion uses oxygen rather than air as an oxygen source, there is concomitant reduction in flue gas produced. In addition, combustion is carried out so that the NOx combustion products are near zero and are due almost exclusively to fuel-borne nitrogen. That is, because oxygen rather than air is used as an oxygen source, there is less mass flow and no nitrogen to contribute to the formation of NOx.

Although oxy-fuel combustion provides fuel efficient and reduced emission energy generation, there is still a fairly substantial amount of emissions that are produced during the combustion process. In addition, because the volume of gas is less, due to the use of oxygen instead of air, the concentration of other pollutants is higher. For example, the mass of SOx and particulate matter will not change, however, the concentration will increase because of the reduced overall volume.

Pollution control or removal systems are known in the art. These systems can, for example, use intimate contact between the flue gases and downstream process equipment such as precipitators and scrubbers to remove particulate matter, sulfur containing compounds and mercury containing compounds. Other systems use serial compression stripping of pollutants to remove pollutants and recover energy from the flue gas stream. Such a system is disclosed in Ochs, U.S. Pat. No. 6,898,936, incorporated herein by reference.

Accordingly, there is a need for a combustion system that produces low flue gas volume with integrated pollution removal. Desirably, such a system takes advantage of known combustion and pollution control systems to provide fuel efficient energy production in conjunction with reduced pollutant production and capture of the remaining pollutants that are produced.

BRIEF SUMMARY OF THE INVENTION

An integrated oxygen fueled combustion system and pollutant removal system, reduces flue gas volumes, eliminates NOx and capture condensable gases. The system includes a combustion system having a furnace with at least one burner that is configured to substantially prevent the introduction of air. An oxygen supply supplies oxygen at a predetermine purity greater than 21 percent and a carbon based fuel supply supplies a carbon based fuel. Oxygen and fuel are fed into the furnace in controlled proportion to each other. Combustion is controlled to produce a flame temperature in excess of 3000 degrees F. and a flue gas stream containing $CO_2$ and other gases and is substantially void of non-fuel borne nitrogen containing combustion produced gaseous compounds.

The pollutant removal system includes at least one direct contact heat exchanger for bringing the flue gas into intimated contact with a cooling liquid, preferably water, to produce a pollutant-laden liquid stream and a stripped flue gas stream. The system includes at least one compressor for receiving and compressing the stripped flue gas stream.

Preferably, the system includes a series of heat exchangers and compressors to cool and compress the flue gas. The flue gas can be cooled and compressed to and the stripped flue gas stream can separated into non-condensable gases and condensable gases. The condensable gases, in large part $CO_2$, are condensed into a substantially liquid state and can be sequestered. The $CO_2$ can be recirculated, in part, to carry a solid fuel such as coal into the furnace.

A method oxy-fuel combustion integrated with pollutant removal includes providing a furnace having at least one burner, and configured to substantially prevent the introduction of air, providing an oxygen supply for supplying oxygen at a predetermine purity greater than 21 percent and providing a carbon based fuel supply for supplying a carbon based fuel.

Either or both of the oxygen and carbon based fuel are limited to less than 5 percent over the stoichiometric proportion and combustion is controlled to produce a flame temperature in excess of 3000 degrees F. and a flue gas stream containing $CO_2$ and other gases and substantially void of non-fuel borne nitrogen containing combustion produced gaseous compounds.

The pollutant removal system is provided which includes a direct contact heat exchanger in serial arrangement with a compressor. The flue gas is brought into intimate contact with a cooling liquid, preferably water, in the heat exchanger to produce a pollutant-laden liquid stream and a stripped flue gas stream. The stripped flue gas stream is fed into the compressor to compress the stripped flue gas stream.

In a preferred method, the steps of cooling the stripped flue gas stream and compressing the cooled stripped flue gas stream are carried out as well as sequestering the compressed cooled stripped flue gas stream.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
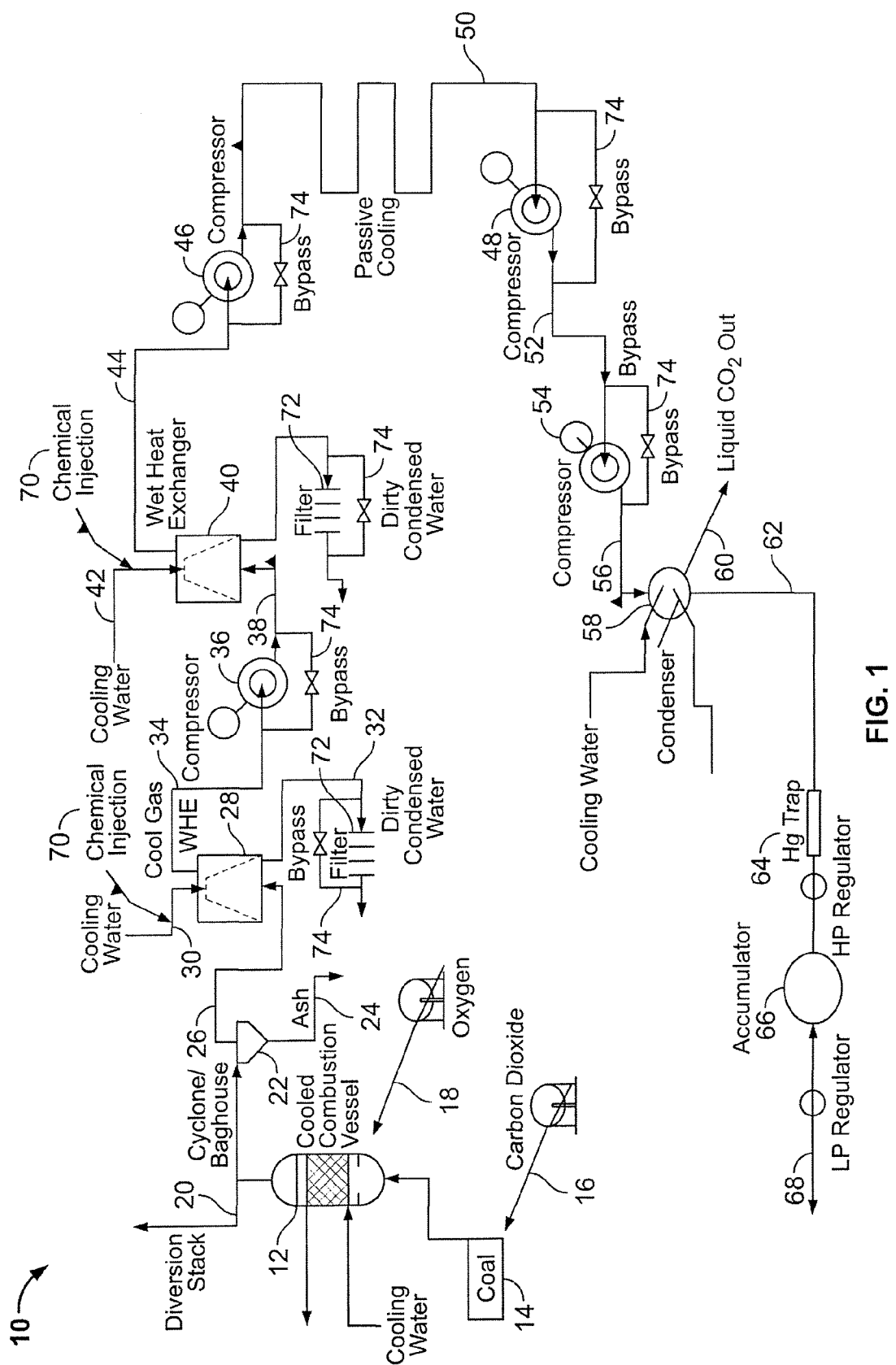
FIG. 1 is flow diagram of an integrated oxy-fuel combustion and pollutant removal system that was assembled for testing the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention", relates to a requirement of the United States Patent Office, and does not imply, nor should be inferred to limit the subject matter disclosed herein.

As discussed in the aforementioned patents to Gross, an oxy-fuel combustion system uses essentially pure oxygen, in combination with a fuel source to produce heat, by flame production (i.e., combustion), in an efficient, environmentally non-adverse manner. Oxygen, which is supplied by an oxidizing agent, in concentrations of about 85 percent to about 99+ percent can be used, however, it is preferable to have oxygen concentration (i.e., oxygen supply purity) as high as possible.

In such a system, high-purity oxygen is fed, along with the fuel source in stoichiometric proportions, into a burner in a furnace. The oxygen and fuel is ignited to release the energy stored in the fuel. For purposes of the present disclosure, reference to furnace is to be broadly interpreted to include any industrial or commercial heat generator that combusts fossil (carbon-based) fuel. For example, water-tube-walled boilers for electrical power generation, as well as direct fired furnaces for industrial applications are contemplated to use the oxy-fueled combustion system. In a preferred system, oxygen concentration or purity is as high as practicable to reduce green-house gas production.

It is contemplated that essentially any fuel source can be used. For example, oxygen can be fed along with natural gas, for combustion in a furnace. Other fuel sources contemplated include oils including refined as well as waste oils, wood, coal, coal dust, refuse (garbage waste), animal wastes and products and the like. Those skilled in the art will recognize the myriad fuel sources that can be used with the present oxy-fuel system.

Compared to conventional combustion processes which use air as an oxidizing agent to supply oxygen, rather than essentially pure oxygen, for combustion, the oxy-fuel system has an overall flow throughput that is greatly reduced. The oxygen component of air (about 21 percent) is used in combustion, while the remaining components (essentially nitrogen) are heated in and exhausted from the furnace. Moreover, the present process uses oxygen in a stoichiometric proportion to the fuel. That is, only enough oxygen is fed in proportion to the fuel to assure complete combustion of the fuel. Thus, no "excess" oxygen is fed into the combustion system.

Many advantages and benefits are achieved using the oxy-fuel combustion system. Aside from increased efficiency (or conversely reduced fuel consumption to produce an equivalent amount of power), because of the reduced input of gas, there is a dramatic decrease in the volume of flue gas. Based on the difference between using air which is 21 percent oxygen and pure oxygen, the volumetric flow rate is about one-fifth ($\frac{1}{5}$) using an oxy-fuel combustion system, compared to a conventional air-fed combustion system. In addition, because there is no energy absorbed by non-combustion related materials (e.g., excess oxygen or nitrogen), more energy is available for the underlying process.

Advantageously, the reduced gas volume (and thus flue gas volume) also increases the residence time of the gases in the furnace or boiler to provide additional opportunity for heat transfer.

In that the overall flue gas volume is so greatly reduced, highly efficient downstream processing that would otherwise not be available or would be impractical can now be used in large scale industrial and power generation settings.

Accordingly, the present invention uses oxy-fuel combustion in conjunction with the removal of multiple pollutants through the integrated condensation of H2O and CO2 with entrainment of particulates and dissolution and condensation of other pollutants including SO2. Such a pollutant removal system and method is disclosed in the aforementioned patent to Ochs et al.

Consolidating the removal of pollutants into one process has the potential to reduce costs and reduce power requirements for operation of such a system. Non-condensable combustion products including oxygen and argon may be present in combustion products. Although the oxy-fuel combustion system is operated at or very near stoichiometry (preferably within 5 percent of stoichiometry), oxygen may be present in the flue gas. Argon can come from the air separation process (remaining in the produced oxygen). Some relatively small amounts of nitrogen may also be present as fuel-borne or as air in-leakage into the underlying process equipment.

Condensable vapors such as H2O, CO2, SOx, and although minimal, NOx, are produced in the combustion process and are the targets for condensation. When referring to combustion products in this invention it is assumed that these condensable vapors and non-condensable gases are present as well as particulates and other pollutants.

The pollutant control portion of the system can also accomplish remediation and recovery of energy from combustion products from a fossil fuel power plant having a fossil fuel combustion chamber (e.g., a boiler, furnace, combustion turbine or the like), a compressor, a turbine, a heat exchanger, and a source of oxygen (which could be an air separation unit). Those skilled in the art will understand and appreciate that reference to, for example, a compressor, includes more than one compressor.

The fossil fuel power plant combustion products can include non-condensable gases such as oxygen and argon; condensable vapors such as water vapor and acid gases such as SOX and (again, although minimal, NOX); and CO2 and pollutants such as particulates and mercury. The process of pollutant removal and sequestration, includes changing the temperature and/or pressure of the combustion products by cooling and/or compressing the combustion products to a temperature/pressure combination below the dew point of some or all of the condensable vapors.

This process is carried out to condense liquid having some acid gases dissolved and/or entrained therein and/or directly condensing the acid gases (such as CO2 and SO2) from the combustion products. It is carried out further to dissolve some of the pollutants thus recovering the combustion products. Dissolve in the context of this disclosure means to entrain and/or dissolve.

This process is repeated through one or more of cooling and/or compressing steps with condensation and separation of condensable vapors and acid gases. The recovery of heat in the form of either latent and/or sensible heat can also be accomplished. The condensation reduces the energy required for continued compression by reducing mass and temperature, until the partially remediated flue gas is $CO_2$, $SO_2$, and $H_2O$ poor. Thereafter the remaining flue gases are sent to an exhaust.

The fossil fuel can be any of those discussed above. In certain instances, the pollutants will include fine particulate matter and/or heavy metals such as mercury other metals such as vanadium.

The present invention also relates to a method of applying energy saving techniques, during flue gas recirculation and pollutant removal, such that power generation systems can improve substantially in efficiency. For example, in the case of a subcritical pulverized coal (PC) system without energy recovery, the performance can drop from 38.3% thermal efficiency (for a modern system without CO2 removal) to as low as 20.0% (for the system with CO2 removal and no energy recovery). A system according to one embodiment of the present invention can perform at 29.6% (with CO2 removal) when energy recovery is included in the model design. it is anticipated that better efficiencies will be achieved. The present oxy-fuel combustion with integrated pollution control is applicable to new construction, repowering, and retrofits.

In an exemplary system using the present oxy-fuel and IPR process, flue gases as described in the table below are predicted. The flue gases will exit from the combustion region or furnace area, where they would pass through a cyclone/bag house or electrostatic precipitator for gross particulate removal. The combustion gas then passes through a direct contact heat exchanger (DCHX). In this unit the flue gases come into contact with a cooler liquid. This cooling step allows the vapors to condense. The step also allows for dissolving the entrained soluble pollutants and fine particles.

The gases exiting the first column are now cleaner and substantially pollutant free. These gases are compressed and can proceed into a successive DCHX and compression step. A final compression and heat exchange step is used to separate the oxygen, argon, and nitrogen (minimal) from the CO2. Also a mercury trap is used to remove gaseous mercury before release to atmosphere.

The table below shows the expected results as a comparison of the present oxy-fuel combustion and IPR system to a conventional air fueled combustion process. As the results show, the volume of flue gas at the outset, is less in the oxy-fuel combustion system by virtue of the elimination of nitrogen from the input stream. In the present system, the IPR serves to further reduce the volume and gas flow through successive compression and cooling stages. As the flue gases progress through the combined processes the final product is captured CO2 for sequestration.

TABLE 1

A COMPARISON OF THE PROPERTIES AND COMPOSITIONS OF IPR-TREATED OXY-FUEL COMBUSTION PRODUCTS WITH THOSE FROM A CONVENTIONAL COAL FIRED BOILER

|  | Conventional after economizer | Oxyfuel exhaust | After $1^{st}$ compression | After $2^{nd}$ compression | After 3rd compression |
|---|---|---|---|---|---|
| Gas Flow (kg/hr) | 1,716,395 | 686,985 | 364,367 | 354,854 | 353,630 |
| Vol flow (m$^3$/hr) | 1,932,442 | 826,995 | 72,623 | 15,944 | 661 |
| Inlet Pressure (psia) | 14.62 | 15.51 | 62 | 264 | 1,500 |
| Inlet Temp. (° F.) | 270 | 800 | 342 | 323 | 88.2 |
| Density (kg/m$^3$) | 0.8882 | 0.8307 | 5.02 | 22.26 | 534.61 |
| $H_2O$ (fraction) | 0.0832 | 0.33222 | 0.0695 | 0.00994 | 0.0004 |
| Ar (fraction) | 0.0088 | 0.01152 | 0.0163 | 0.01730 | 0.0175 |
| $CO_2$ (fraction) | 0.1368 | 0.61309 | 0.8662 | 0.92161 | 0.9305 |
| $N_2$ (fraction) | 0.7342 | 0.00904 | 0.0128 | 0.01359 | 0.0137 |
| $O_2$ (fraction) | 0.0350 | 0.02499 | 0.0353 | 0.03755 | 0.0379 |
| $SO_2$ (fraction) | 0.0020 | 0.00913 | 0.0000 | 0.00000 | 0.0000 |

As can be seen from the data of Table 1, the volume of the combustion products has dropped significantly as a result of the successive compressing and cooling stages. The result is a capture of CO2 and subsequent sequestration, which is the ultimate goal. The CO2 thus resulting can be stored or used in, for example, a commercial or industrial application.

A test system 10 was constructed to determine the actual results vis-à-vis oxy-fuel combustion in conjunction with CO2 sequestration and pollutant removal. A schematic of the test system is illustrated in FIG. 1. The system 10 includes an oxy-fueled combustor 12 having a coal feed 14 (with CO2 as the carrier gas 16), and an oxygen feed 18. Coal was fed at a rate of 27 lbs per hour (pph), carried by CO2 at a rate of 40 pph, and oxygen at a rate of 52 pph. In that the system 10 was a test system rather than a commercial or industrial system (for example, a commercial boiler for electrical generation), the combustor 12 was cooled with cooling water to serve as an energy/heat sink.

The combustor exhaust 20 flowed to a cyclone/bag house 22 at which ash (as at 24) was removed at a rate of about 1 pph. Following ash removal 24, about 118 pph of combustion gases remained in the flue gas stream 26 at an exit temperature that was less than about 300° F.

The remaining flue gases 26 were then fed to a direct contact heat exchanger 28 (the first heat exchanger). Water (indicated at 30) was sprayed directly into the hot flue gas stream 26. The cooling water condensed some of the hot water vapor and further removed the soluble pollutants and entrained particulate matter (see discharge at 32). About 13 pph of water vapor was condensed in the first heat exchanger 28—the flue gases that remained 34 were present at a rate of about 105 pph.

Following exit from the first heat exchanger 28, the remaining gases 34 were fed into a first, a low pressure compressor 36, (at an inlet pressure of about atmospheric) and exited the compressor 36 at a pressure of about 175 lbs per square inch gauge (psig). As a result of the compression stage, the temperature of the gases 38 increased. The remaining flue gases were then fed into a second direct contact heat exchanger 40 where they were brought into intimate contact with a cooling water stream as at 42. The exiting stream 44 released about an additional 4 pph of water and thus had an exiting exhaust/flue gas 44 flow rate of about 101 pph.

Following the second heat exchanger 40, the gases 44 were further compressed to about 250 psig at a second compressor 46. Although the second compression stage resulted in a temperature increase, it was determined during testing that a third heat exchange step was not necessary. It will be appreciated that in larger scale operation, however, such additional heat exchange/cooling stages may be necessary.

A third compression stage, at a third compressor 48 was then carried out on the remaining flue gases 50 to increase the pressure of the exiting gas stream 52 to about 680 psig. Again, it was determined that although the temperature of the gases increased, active or direct cooling was not necessary in that losses to ambient through the piping system carrying the gases were sufficient to reduce the temperature of the gases.

A final compression, at a final compressor 52, of the gases was carried out to increase the pressure of the gases to about 2000 psig. Following the final compression stage, the remaining gases 56 were fed into a heat exchanger 58, the final heat exchanger, in which the temperature of the stream 56 was reduced to below the dew point of the of the gases and as a result, condensation of the gases commenced. The condensate (as at 60), which was principally liquefied CO2 (at a rate of 80 pph), was extracted and sequestered. In the present case, the CO2 was bottled, and retained.

The non-condensable gases (as at 62), which included a small amount of CO2, were passed through a mercury filter 64 and subsequently bled into an accumulator 66. The accumulator 66 provided flexibility in control of the system flow rate. The exhaust 68 from the accumulator 66 was discharged to the atmosphere. The flow rate from the accumulator 66, normalized to steady state from the overall system, was about 21 pph.

It will be appreciated by those skilled in the art that the above-presented exemplary system 10 was for testing and verification purposes and that the number and position of the compression and cooling stages can and likely will be changed to accommodate a particular desired design and/or result. In addition, various chemical injection points 70, filters 72, bypasses 74 and the like may also be incorporated into the system 10 and, accordingly, all such changes are within the scope and spirit of the present invention.

The projected fuel savings and other increased efficiencies of the present oxy-fuel combustion system with IPR are such that the cost of this combined process is anticipated to be competitive with current combustion technologies. Additionally, the prospect of new regulatory requirements are causing power plant designers to revisit the conventional approaches used to remove pollutants which would only serve to improve the economics behind this approach.

It will be appreciated that the use of oxy-fueled combustion systems with IPR in many industrial and power generating applications can provide reduced fuel consumption with equivalent power output or heat generation. Reduced fuel consumption, along with efficient use of the fuel (i.e., efficient combustion) and integrated IPR provides significant reductions in overall operating costs, and reduced and sequestered emissions of other exhaust/flue gases.

Due to the variety of industrial fuels that can be used, such as coal, natural gas, various oils (heating and waste oil), wood and other recycled wastes, along with the various methods, current and proposed, to generate oxygen, those skilled in the art will recognize the enormous potential, vis-à-vis commercial and industrial applicability, of the present combustion system. Fuel selection can be made based upon availability, economic factors and environmental concerns. Thus, no one fuel is specified; rather a myriad, and in fact, all carbon based fuels are compatible with the present system. Accordingly, the particulate removal stages of the integrated IPR system may vary.

As to the supply of oxygen for the oxy-fueled burners (combustion system), there are many acceptable technologies for producing oxygen at high purity levels, such as cryogenics, membrane systems, absorption units, hydrolysis and the like. All such fuel uses and oxygen supplies are within the scope of the present invention.

In general, the use of oxygen fuel fired combustion over current or traditional air fuel systems offers significant advantages in many areas. First is the ability to run at precise stoichiometric levels without the hindrance of nitrogen in the combustion envelope. This allows for greater efficiency of the fuel usage, while greatly reducing the NOx levels in the burn application. Significantly, less fuel is required to achieve the same levels of energy output, which in turn, reduces the overall operating costs. In using less fuel to render the same power output, a natural reduction in emissions results. Fuel savings and less emissions are but only two of the benefits provided by the present system. In conjunction with the integrated pollutant removal (IPR) system, the present oxy-fuel IPR system provides far greater levels of efficiency and pollution control than known systems.

It is anticipated that combustors (e.g., boilers) will be designed around oxygen fueled combustion systems with integrated IPR to take full advantage of the benefits of these systems. It is also anticipated that retrofits or modifications to existing equipment will also provide many of these benefits both to the operator (e.g., utility) and to the environment.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An oxygen fueled integrated pollutant removal and combustion system comprising:
   an oxy-fuel combustion system for producing a flue gas containing $CO_2$ and other gases and substantially void of non-fuel borne nitrogen containing combustion produced gaseous compounds; and
   a pollutant removal system for directly receiving flue gas from said oxy-fuel combustion system and consolidating removal of multiple pollutants from said flue gas in a single process, said pollutant removal system comprising:
   at least one direct contact heat exchanger for bringing said flue gas into intimated contact with a cooling liquid to produce a pollutant-laden liquid stream which includes soluble and entrained particulates and a stripped flue gas stream containing condensable and non-condensable vapors;

a discharge for discharging said pollution laden stream;

one or more compressors for receiving said stripped flue gas stream from said at least one direct contact heat exchanger and compressing said stripped flue gas stream defining a compressed flue gas stream;

at least one heat exchanger for receiving the compressed flue gas stream from said at least one or more compressors, said one or more compressors and said at least one heat exchanger configured to separate condensable vapors from non-condensable vapors by way of cooling of said compressed flue gas stream in order to condense said $CO_2$ and any other condensable vapors defining condensed vapors and non-condensable vapors;

a discharge connected to said at least one heat exchanger for discharging said condensed vapors; and a filter connected to said at least one heat exchanger for filtering said non-condensable vapors before releasing the flue gas to the atmosphere.

2. The integrated combustion system in accordance with claim 1 wherein the cooling liquid is water.

3. The integrated combustion system in accordance with claim 1 including at least two compressors.

4. The integrated combustion system in accordance with claim 1 wherein the stripped flue gas stream is separated into non-condensable gases and condensable gases.

5. The integrated combustion system in accordance with claim 4 wherein the condensable gases are condensed into a substantially liquid state.

6. The integrated combustion system in accordance with claim 5 wherein the gases condensed into the substantially liquid state are sequestered.

7. The integrated combustion system in accordance with claim 6 wherein the gases condensed into the substantially liquid state are, in large part, $CO_2$.

8. The integrated combustion system in accordance with claim 1 wherein the carbon based fuel is a solid fuel and wherein the stripped flue gas stream is recirculated, in part, to carry the carbon based fuel into the oxy-fuel combustor.

9. The integrated combustion system in accordance with claim 8 wherein the stripped flue gas stream is substantially $CO_2$.

10. The integrated combustion system in accordance with claim 1 further including at least two heat exchangers and a plurality of compressors, wherein at least two of the heat exchangers are direct contact heat exchangers for intimately contacting cooling water with the flue gas stream and wherein at least one of said plurality of compressors is disposed between the heat exchangers for compressing the stripped flue gas, stream between the heat exchangers.

11. The integrated combustion system in accordance with claim 1 including at least two heat exchangers.

12. A combustion and integrated pollutant removal method comprising the steps of:

initiating combustion in an oxy-fuel combustion system producing a flue gas stream containing $CO_2$ and other gases and substantially void of non-fuel borne nitrogen containing combustion produced gaseous compounds; and directing the flue gas to a pollutant removal system which includes a direct contact heat exchanger in serial arrangement with a compressor;

bringing the flue gas into intimated contact with a cooling liquid in the heat exchanger to produce a pollutant-laden liquid stream and a stripped flue gas stream;

discharging said pollutant laden stream;

feeding the stripper flue gas stream into at least one compressor and at least one heat exchanger configured to separate $CO_2$ and other condensable vapors from non-condensable vapors in the stripped flue gas stream;

discharging said $CO_2$ and other condensable vapors;

filtering said non-condensable vapors from said stripped flue gas stream; and discharging said stripped flue gas stream to the atmosphere.

13. The method in accordance with claim 12 including the steps of cooling the stripped flue gas stream by compressing the cooled stripped flue gas stream.

14. The method in accordance with claim 13 including the step of sequestering the compressed cooled stripped flue gas stream.

15. The integrated combustion system in accordance with claim 1 wherein the at least one compressor is used in a gas compression stage to compress gasses and wherein said at least one compressor includes more than one compression stage.

16. The integrated combustion system in accordance with claim 1 wherein the heat exchanger is used in a gas-to-liquid condensation stage to produce a condensate stream and there is more than one condensation stage.

17. The integrated combustion system in accordance with claim 1 wherein the stripped flue gas is compressed and cooled to produce a liquid.

18. The integrated combustion system in accordance with claim 17 wherein the liquid produced is in large part $CO_2$.

19. The integrated combustion system in accordance with claim 1 wherein the carbon based fuel is a solid fuel.

20. The integrated combustion system in accordance with claim 19 wherein the solid fuel is coal.

21. The integrated combustion system in accordance with claim 20 wherein part of the flue gas stream is recirculated, in part, to carry the carbon based fuel into the furnace.

* * * * *